(12) United States Patent
Mitchell et al.

(10) Patent No.: US 9,919,832 B2
(45) Date of Patent: Mar. 20, 2018

(54) SHIPPING CONTAINER AND SPRING LOCK THEREFOR

(71) Applicant: Macro Plastics, Inc., Fairfield, CA (US)

(72) Inventors: Jeffrey W. Mitchell, Lexington, KY (US); Todd T. Turner, Corydon, IN (US)

(73) Assignee: MACRO PLASTICS, INC., Fairfeild, CA (US)

( * ) Notice: Subject to any disclaimer, the term of this patent is extended or adjusted under 35 U.S.C. 154(b) by 171 days.

(21) Appl. No.: 14/785,760

(22) PCT Filed: May 12, 2014

(86) PCT No.: PCT/US2014/037652
§ 371 (c)(1),
(2) Date: Oct. 20, 2015

(87) PCT Pub. No.: WO2014/186264
PCT Pub. Date: Nov. 20, 2014

(65) Prior Publication Data
US 2016/0068301 A1 Mar. 10, 2016

Related U.S. Application Data

(60) Provisional application No. 61/822,523, filed on May 13, 2013.

(51) Int. Cl.
| | |
|---|---|
| *B65D 6/18* | (2006.01) |
| *F16B 5/06* | (2006.01) |
| *B65D 6/34* | (2006.01) |
| *B65D 19/18* | (2006.01) |

(52) U.S. Cl.
CPC .......... *B65D 11/1833* (2013.01); *B65D 11/22* (2013.01); *B65D 19/18* (2013.01);
(Continued)

(58) Field of Classification Search
CPC .... B65D 11/1833; B65D 11/22; B65D 19/18; B65D 2519/00034; B65D 2519/00069;
(Continued)

(56) References Cited

U.S. PATENT DOCUMENTS

| | | | |
|---|---|---|---|
| 827,096 A | * | 7/1906 | Greiner .................. B65D 45/18 215/287 |
| 1,524,966 A | | 2/1925 | Boelman et al. |

(Continued)

FOREIGN PATENT DOCUMENTS

| | | |
|---|---|---|
| DE | 202011104001 U1 | 12/2011 |
| WO | 9205078 A1 | 4/1992 |

OTHER PUBLICATIONS

The United States Patent and Trademark Office; The International Search Report and Written Opinion of PCT/US2014/037652; Search Report and Written Opinion; dated Sep. 10, 2014; pp. 1-13; The United States Patent and Trademark Office; U.S.A.

*Primary Examiner* — Andrew Perreault
(74) *Attorney, Agent, or Firm* — Wyatt, Tarrant & Combs, LLP; Matthew A. Williams; Max E. Bridges (57) ABSTRACT

A spring lock for interconnecting adjacent walls of a shipping container having foldable walls, said spring lock including a mounting portion and a clamping portion, and a shipping container with foldable walls wherein at least one pair of adjacent walls is interconnected with a spring lock.

3 Claims, 7 Drawing Sheets

(52) U.S. Cl.
CPC ...... *F16B 5/0614* (2013.01); *B65D 2519/009* (2013.01); *B65D 2519/00034* (2013.01); *B65D 2519/00069* (2013.01); *B65D 2519/00174* (2013.01); *B65D 2519/00333* (2013.01); *B65D 2519/00422* (2013.01); *B65D 2519/00611* (2013.01); *B65D 2519/00646* (2013.01)

(58) Field of Classification Search
CPC .......... B65D 2519/00174; B65D 2519/00333; B65D 2519/00422; B65D 2519/00611; B65D 2519/00646; B65D 2519/009; B65D 45/16; B65D 45/18; B65D 11/1866; B65D 11/1873; B65D 11/1893; F16B 5/0614
USPC ............................................ 220/4.33; 24/561
See application file for complete search history.

(56) References Cited

U.S. PATENT DOCUMENTS

| | | | | |
|---|---|---|---|---|
| 2,695,806 A * | 11/1954 | Balint | ................ | B65D 45/18 217/69 |
| 3,297,815 A * | 1/1967 | Drettmann | ............. | H02G 3/286 174/135 |
| 3,420,399 A * | 1/1969 | Heisler | .................. | B65D 45/18 220/324 |
| 4,024,977 A * | 5/1977 | Rowley | .................... | B65D 9/24 217/12 R |
| 4,453,471 A * | 6/1984 | Harrington | ............. | B65D 9/24 108/55.1 |
| 4,796,392 A | 1/1989 | Graham, Jr. | | |
| 5,535,909 A | 7/1996 | Philip | | |
| D436,311 S * | 1/2001 | Edvardsson | ................... | D8/382 |
| 6,203,235 B1 * | 3/2001 | Bonde | ...................... | B65D 9/24 16/384 |
| 6,592,000 B1 * | 7/2003 | Owens | ...................... | A61L 2/26 220/324 |
| 6,598,756 B1 | 7/2003 | Rosenfeldt | | |
| 8,287,009 B2 * | 10/2012 | Dane | ......................... | A61L 2/26 292/125 |
| 2001/0019056 A1 | 9/2001 | Rosenfeldt | | |
| 2014/0209600 A1 * | 7/2014 | Schloesser | ............... | B65D 7/24 220/4.33 |

\* cited by examiner

Detail A

SHIPPING CONTAINER AND SPRING LOCK THEREFOR

CROSS-REFERENCE TO RELATED APPLICATIONS

This national stage patent application, filed under 35 U.S.C. 371, claims priority to PCT Patent Application Number PCT/US14/37652 filed on 12 May 2014, which claims priority to U.S. Provisional Patent Application No. 61/822,523 filed on 13 May 2013, which is hereby incorporated by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention generally relates to shipping containers, and more specifically to a shipping container having sidewalls that can be rotated from a horizontal, stowed position, which minimizes storage and transportation costs of empty containers, to a vertical position allowing containers to be loaded and stacked two or more containers high.

2. General Background of the Invention

For many years, industries dealing in bulk goods have utilized returnable containers featuring folding sidewalls that minimize the cost associated with storing and transporting empty containers. In general, such containers include a first pair of opposing sidewalls ("primary sidewalls") that must be the first two walls raised to an upright position. Such primary sidewalls typically have edge portions that wrap around toward the other primary sidewall. Such containers also generally contain a second pair of opposing sidewalls ("secondary sidewalls") that can be raised to an upright position only after the primary sidewalls have been raised to their upright position. The edge portions of the secondary sidewalls will typically engage the "wrap around" edge portions of the primary sidewall to add rigidity to the container. Frequently, the edge portions of the primary sidewall and the secondary sidewall are designed to mate together, for example by providing recesses in the edge portion of the primary sidewalls to receive protuberances extending from the edge portions of the secondary sidewalls.

In many applications, such configurations provide the necessary strength and resiliency. But when loaded containers are transported while stacked, problems can arise when the bottom container is brought to an abrupt stop. This results in the momentum of the upper container applying an outward force to the sidewall of the lower container that is facing the direction in which it had previously been moving. Such containers are generally able to withstand such force when applied to one of the secondary sidewalls, especially when the edge portions of the primary and secondary sidewalls are design to mate together so long as the length of the wrap around portion of the primary sidewalls is kept to a minimum to minimize the moment applied to the primary sidewalls.

When such an outward force is applied to one of the primary sidewalls, failures occur on a much more frequent basis. The reason for this is that the latching mechanism and the mating of the sides through recesses and fingers do not collectively have the strength to resist a large outward force applied to the upper portion of the primary sidewall. The primary means of trying to overcome this is by extending the length of the wrap around edge portions of the primary sidewalls to make the primary sidewall more rigid. This, however, has the effect of increasing the moment resulting from an outward force applied to a secondary sidewall and leads to more failures resulting from the application of this type of force. Extending the wrap around edge portion also has the drawback of reducing the width available for a drop-down access panel or door in the secondary sidewall (such drop-down panels are frequently provided to facilitate access to goods stored within such containers).

What is needed then is a container with folding sidewalls that is capable of resisting the outward force applied to any one of its sidewalls resulting when a stack of loaded containers is being moved and the bottom container is brought to an abrupt stop. Such container should also be capable of passing the standard industry inclined impact test that involves placing two loaded containers (the load for each container can be as much as 2000 pounds) with one container stacked on the other. The loaded containers are then allowed to slide down an inclined surface, and at the terminal point of the test the bottom container is impacted and brought to an abrupt halt, resulting in the momentum of the upper container placing an outward force on the upper portion of the downhill sidewall of the bottom container.

SUMMARY OF THE INVENTION

The present invention relates to a shipping container having folding sidewalls, the sidewalls further comprising a pair of primary sidewalls, each said primary sidewall having an edge portion that wraps around and extends toward the opposing sidewall, and a pair of secondary sidewalls having edge portions designed to mate with the wrap around edge portions of the primary sidewalls when the sidewalls are in their vertical positions, and a spring lock further interconnecting each primary sidewall to each secondary sidewall to enable such container to resist the outward force applied to a primary sidewall when the bottom container is brought to an abrupt stop when a stack of loaded containers is being transported.

BRIEF DESCRIPTION OF THE DRAWINGS

For a further understanding of the nature, objects, and advantages of the present invention, reference should be had to the following detailed description, read in conjunction with the attached figures, wherein like reference numerals denote like elements.

DETAILED DESCRIPTION OF THE INVENTION

Figure 1:
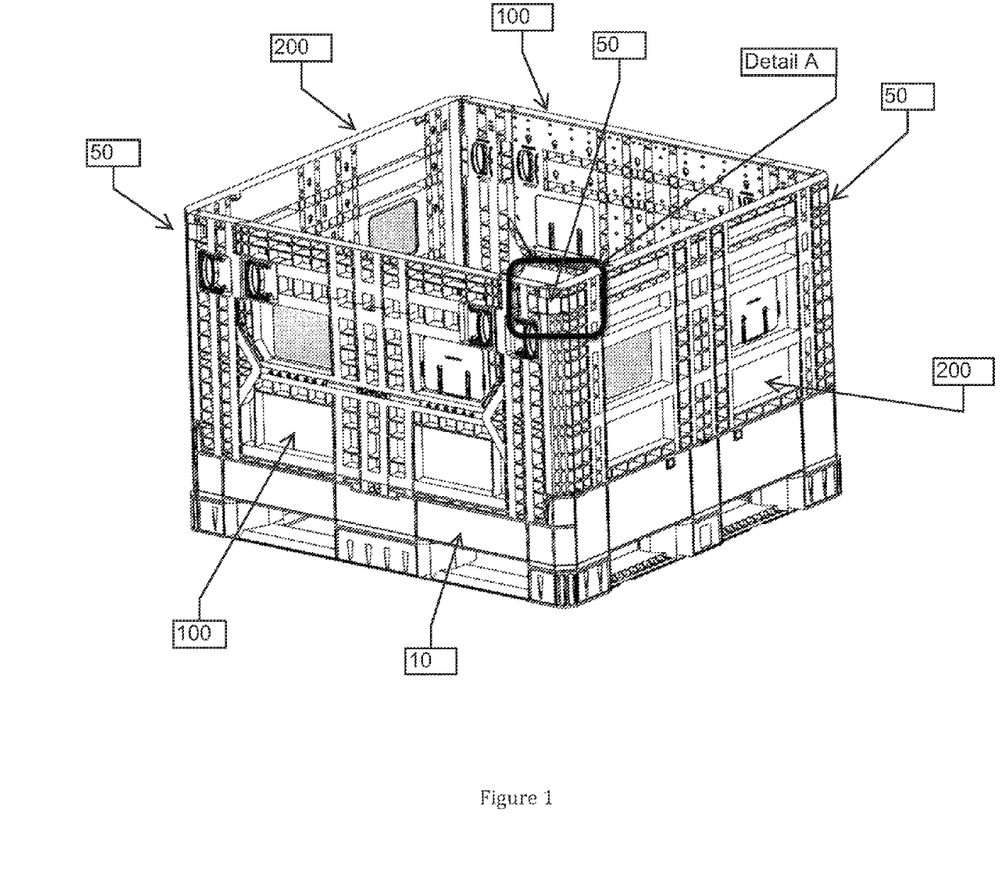
FIG. 1 is a perspective view of an embodiment of a container using an embodiment of the spring lock described herein.
Figure 2:
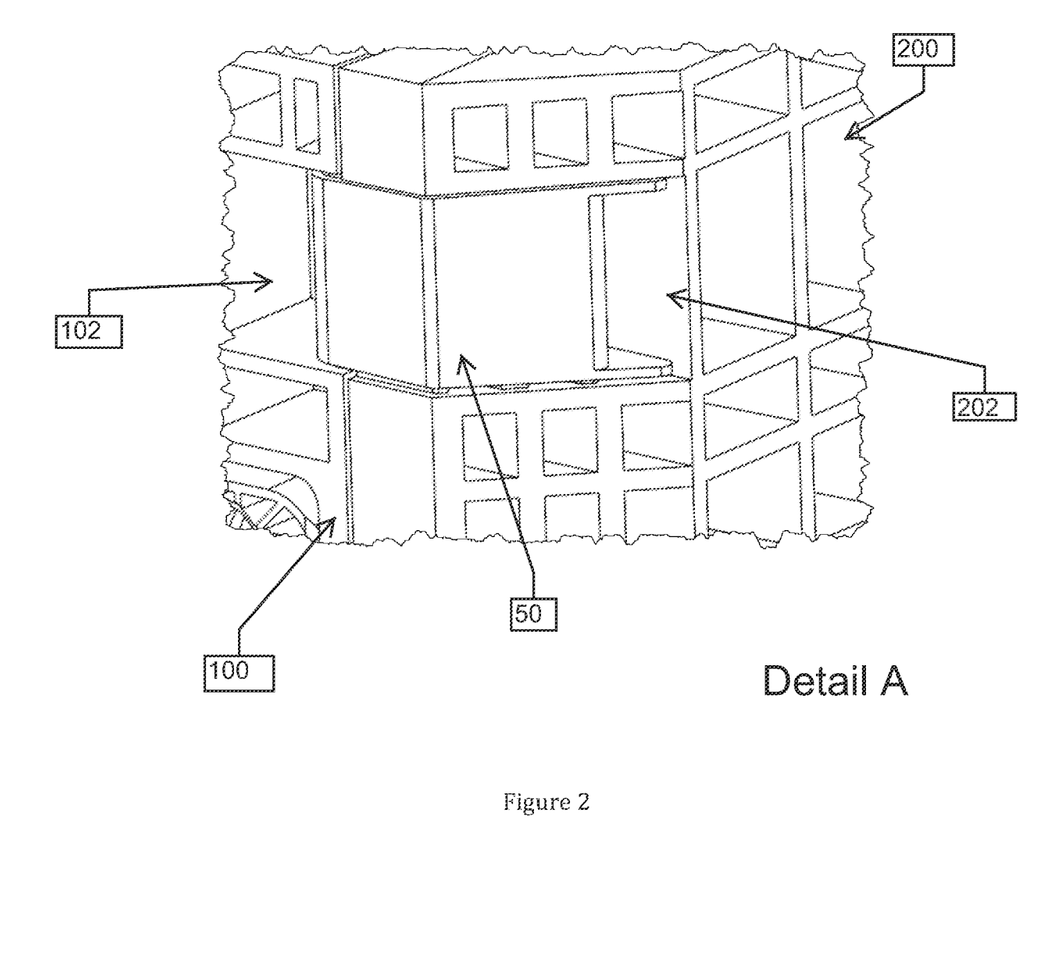
FIG. 2 is a perspective view of the Detail A portion of the container from FIG. 1.
Figure 3:
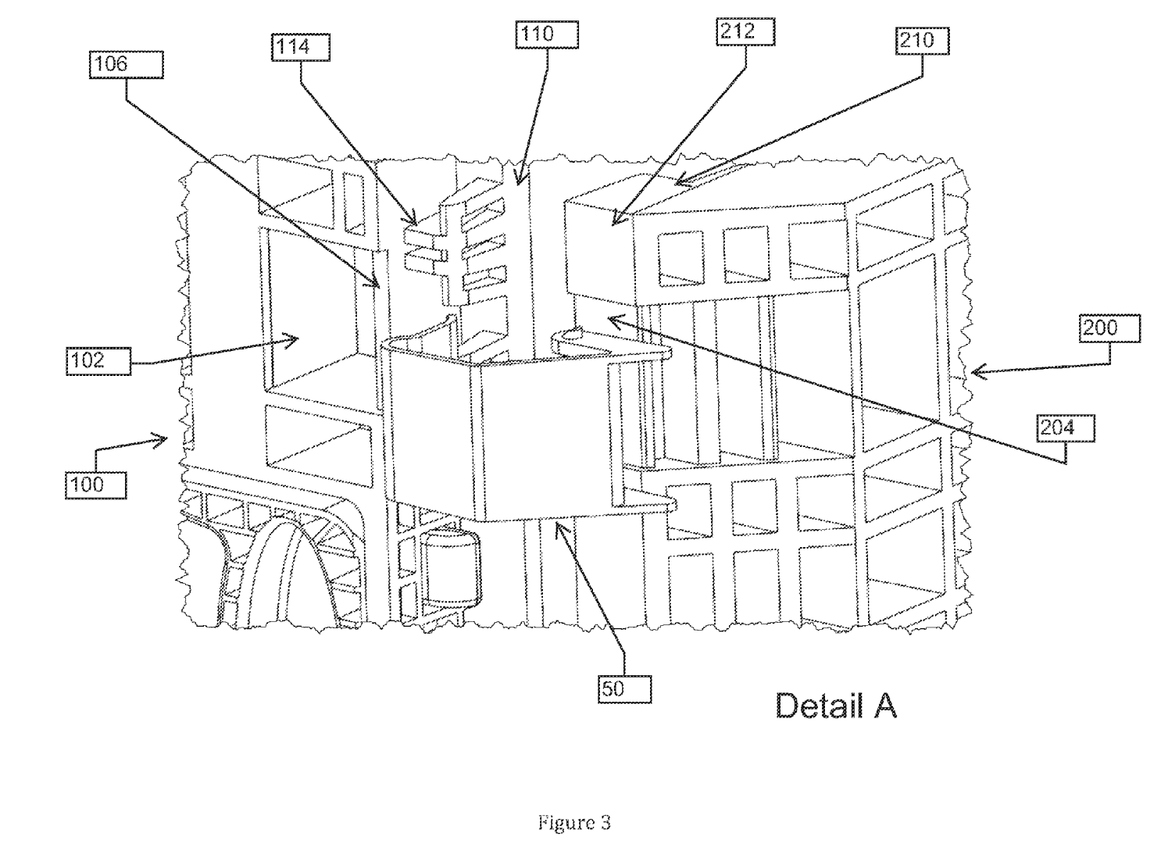
FIG. 3 is an exploded perspective view of Detail A.
Figure 4:
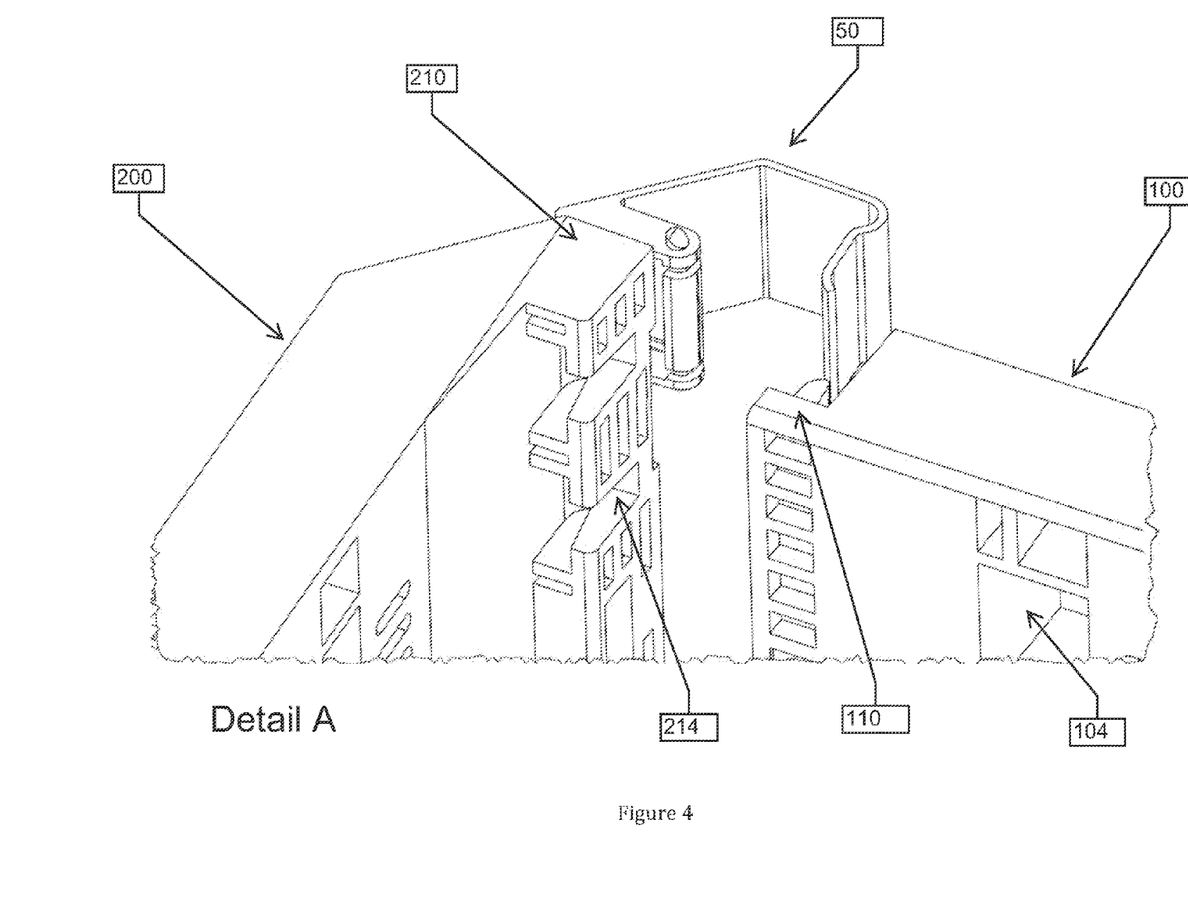
FIG. 4 is an exploded perspective view of Detail A from an alternate angle.

The present invention is a shipping container for bulk goods. Referring now to FIG. 1, container 1 comprises rectangular base 10, opposing pair of primary sidewalls 100, opposing pair of secondary sidewalls 200, and spring locks 50. Except as expressly noted herein, for purposes of the elements and limitations of the present invention each of primary sidewalls 100 are considered to be identical and each of secondary sidewalls 200 are considered to be identical. In practice, each sidewall may have differing features unrelated to the elements and limitations of the present invention such as secondary access panels or doors.

Secondary sidewalls 100 are rotatably connected to opposing side portions of base 10 such that secondary sidewalls 100 can be folded flat onto base 10 with one of secondary sidewalls 100 resting on the upper surface of base 10 and the other secondary sidewall 100 resting on the first secondary sidewall 100.

Primary sidewalls 200 are rotatably connected to base portion 10 such that primary sidewalls 200 can be folded flat onto secondary sidewalls 100 with one of primary sidewalls 200 resting on the upper secondary sidewall 100 and the other primary sidewall 200 resting on the first primary sidewall 200. Each primary sidewall 200 includes support portions 210 that extend inward from the inner surface of primary sidewall 200 along opposing edge portions 220 of primary sidewall 200. In certain embodiments, when primary sidewalls 200 and secondary sidewalls 100 are rotated to their upright position, at least the portion of outer surface 212 of each support portion 210 adjacent to a secondary sidewall 100 aligns with the outer surface the adjacent secondary sidewall.

Each secondary sidewall 100 includes opposing mating portions 110 that engage support portions 210 of the primary sidewalls 200. Said engagement may simply be an abutment of two flat surfaces (not shown). Alternatively, support portions 210 and mating portions 110 can have complementary designs allowing the portions to be physically interlocked. One example would be keyways 214 defined in support portions 210 to receive mating protuberances 114 extending from mating portions 110.

Figure 6:
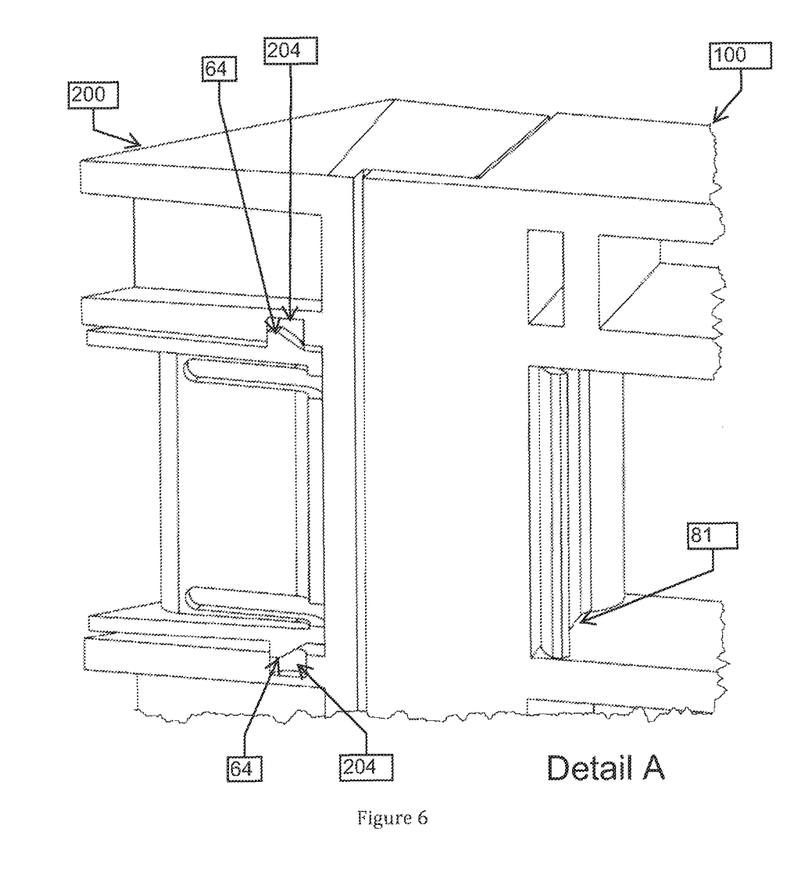
FIG. 6 is vertical sectional view of the perspective view of Detail A.
Figure 7:
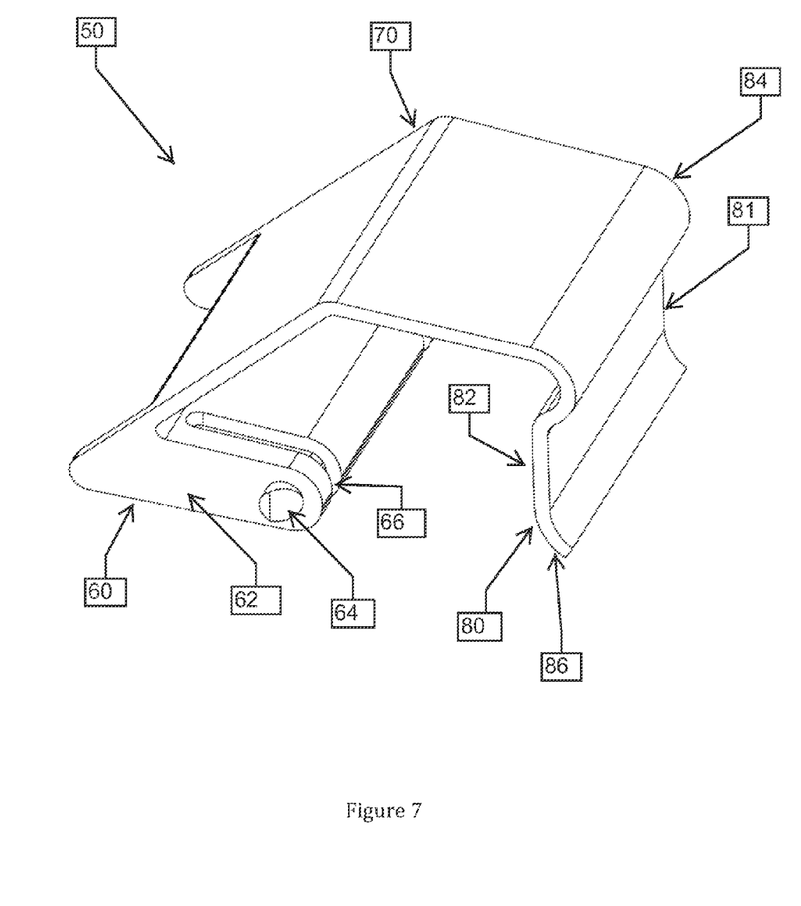
FIG. 7 is a perspective view of an embodiment of the spring lock.

Each primary sidewall 200 is further connected to secondary sidewall 100 using one or more spring locks 50. If a single spring lock 50 is used to connect a primary sidewall 200 to a secondary sidewall 100 (as shown in the illustrations), spring lock 50 is preferably located toward an upper portion of primary sidewall 200 and secondary sidewall 100. Mounting portion 60 of each spring lock 50 is affixed to primary sidewall 200. In the illustrated embodiment, mounting portion 60 comprises wedge-shaped portion 62 to be inserted in recess 202 defined in primary sidewall 200. To facilitate the retention of mounting portion 60 by recess 202, nubs 64 extending outward from wedge-shaped portion 62 to contact the upper and lower surfaces defining recess 202 may be provided. Nubs 64 may be chamfered to ease the insertion of mounting portion 60 into recess 202. To further enhance retention while easing assembly, wedge-shaped portion 62 may further define slot 66 to permit easier compression of mounting portion 60 as it is inserted into recess 202 provided that the material used for spring lock 50 is sufficiently resilient to maintain a compressive force against the upper and lower surfaces defining recess 202 through nubs 64. Retention may also be enhanced by defining depressions 204 in the upper and lower surfaces defining recess 202 for receiving nubs 64 when mounting portion 60 is inserted in recess 202 (best seen in FIG. 6). The foregoing and illustrated embodiments of mounting portion 60 are exemplary in nature. Affixation of spring lock 50 to primary sidewall 200 and the configuration of mounting portion 60 can, however, occur in many ways that would be known to those of skill in the art. For example, in an alternative embodiment, mounting portion 60 could be a flat portion that is screwed to primary sidewall 200.

Connecting portion 70 of spring lock 50 extends from mounting portion 60 along the outer surface of primary sidewall 200 to the edge portion of primary sidewall 200 adjacent to secondary sidewall 100. Alternatively, primary sidewall 200 may define recessed area 204 to receive connecting portion 70 of spring lock 50 to keep spring lock 50 in alignment and to avoid having the outer surface of spring lock 50 extend proud of the outer surface of primary sidewall 200.

Figure 5:
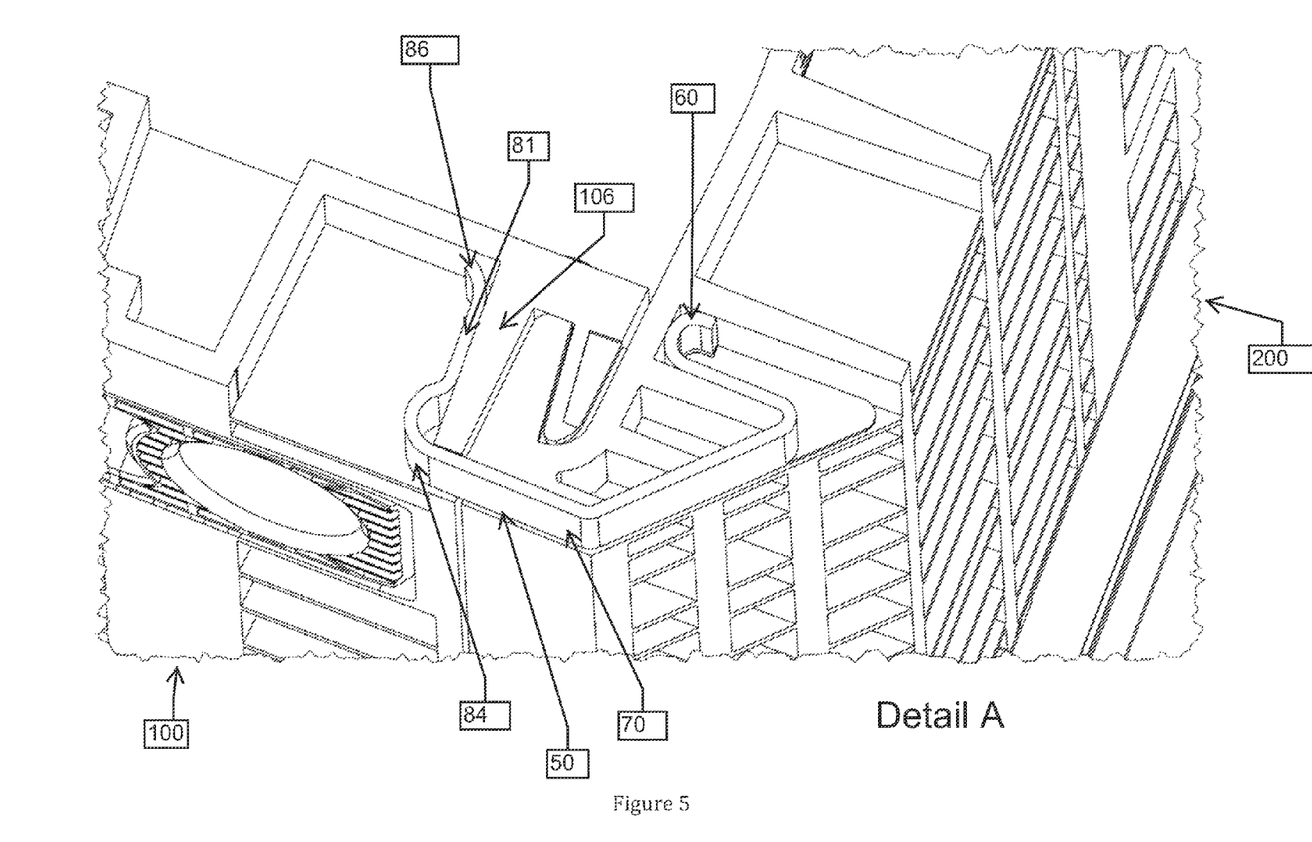
FIG. 5 is a horizontal sectional view of the perspective view of Detail A.

Binder portion 80 of spring lock 50 extends beyond connecting portion 70 of spring lock 50 and turns to be received into mating recess 102 defined in secondary sidewall 100 in part by surface 104 of rib 106. Binder portion 80 is configured such that clamping surface 82 of the clamping section 81 applies a compressive force against inner surface 104 of mating recess 102 that is defined by rib 106, mating recess 102 being adjacent to primary sidewall 200. (This arrangement is best seen in FIG. 5.) In the illustrated embodiment, binder portion 80 is configured such that the gap between the edge portion of primary sidewall 200 and clamping surface 82 is less than the thickness of rib 106. The compressive force may be enhanced by providing binder portion 80 of spring lock 50 with curved section 84 intermediate connecting portion 70 and clamping surface 82. To facilitate rotation of secondary sidewall 100 to its vertical position, binder portion 80 may further comprise upturned lip portion 86.

The foregoing is merely one illustrative embodiment. One of skill in the art would be familiar with any number of configurations that would make the invention operative. The key design considerations, especially in selecting the material for spring lock 50, are twofold. First, to avoid increasing the moment applied to primary sidewall 200 in the event of a force applied outward against secondary sidewall 100, the compressive force generated by spring lock 50 against inner surface 104 of rib 106 of secondary sidewall 100 should not prevent inner surface 104 from sliding relative to spring lock 50 in the direction of such a force. Second, the compressive force of spring lock 50 against inner surface 104 should be sufficient to allow primary sidewalls 200 and the secondary sidewall 100 interconnecting primary sidewalls 200 to resist an outward force applied to an upper portion of one of primary sidewalls 200 that is greater than or equivalent to the outward force that would be applied if a second fully loaded container 1 (the weight of the load can be as much as 2000 pounds) were stacked on top of a first fully loaded container and the stacked containers allowed to slide down a standard inclined impact tester with the stacked containers being impacted at the bottom of first container, bringing the first container to an abrupt halt.

Subject to the foregoing performance considerations, spring lock 50 can be formed from any suitable semi-rigid material that provides sufficient spring force to enable spring lock 50 to exert the requisite amount of compressive force for the particular container size and container loading capacity. Suitable materials include metals, fiberglass, carbon fiber, plastics, and other materials that meet the above requirements.

The foregoing described embodiments are exemplary in nature and are not intended to limit the scope of the invention.

We claim:

1. A shipping container comprising:
a rectangular base, said rectangular base having four edge portions;
a pair of primary sidewalls, each of said primary sidewalls being pivotally connected to opposing edge portions of said base, each of said primary sidewalls having an interior surface and each of said primary sidewalls having opposing vertical end portions, each vertical end portion further comprising a mating portion extending perpendicularly from an inner surface of the primary sidewall;
a pair of secondary sidewalls, each of said secondary sidewalls being pivotally connected to opposing edge portions of said base and each of said secondary sidewalls having opposing vertical end portions configured to interface with said mating portions of the primary sidewalls when said secondary sidewalls are in a vertical position;
a spring lock affixed to each vertical end portion of the primary sidewalls, each spring lock having a mounting portion, a binder portion, and a connecting portion extending between the mounting portion and the binder portion, said binder portion further comprising a clamping section;
a mating recess defined in the vertical end portions of each secondary sidewall to receive the binder portion of the spring lock such that a clamping surface of the clamping section of the spring lock is compressed against an inner wall portion of said recess when the secondary sidewalls are in a vertical position;
a mounting recess defined in each of the opposing vertical end portions of the primary sidewalls wherein the mounting portion of each spring lock is inserted into one of said mounting recesses, each said mounting recess having upper and lower surfaces therein and vertically opposed depressions defined in said upper and lower surfaces; and
opposing nubs extending outward from edge portions of the mounting portion of the spring lock
wherein the mounting portion of each spring lock is inserted into one of said mounting recesses and the nubs extending outward from the mounting portion of each spring lock are received by the vertically opposed depressions defined in said upper and lower surfaces of each mounting recess.

2. The shipping container of claim 1 wherein the mounting portion of each spring lock further comprises a slot extending from an end portion of the spring lock toward the connecting portion of the spring lock.

3. A shipping container comprising:
a rectangular base, said rectangular base having four edge portions;
a pair of primary sidewalls, each of said primary sidewalls being pivotally connected to opposing edge portions of said base, each of said primary sidewalls having an interior surface and each of said primary sidewalls having opposing vertical end portions, each vertical end portion further comprising a mating portion extending perpendicularly from an inner surface of the primary sidewall and a mounting recess, each mounting recess having upper and lower surfaces therein and vertically opposed depressions defined in said upper and lower surfaces;
a pair of secondary sidewalls, each of said secondary sidewalls being pivotally connected to opposing edge portions of said base and each of said secondary sidewalls having opposing vertical end portions configured to interface with said mating portions of the primary sidewalls when said secondary sidewalls are in a vertical position;
a spring lock affixed toward the upper portion of each vertical end portion of the primary sidewalls, each spring lock further comprising
a mounting portion, the mounting portion further comprising a pair of opposing nubs extending outward from opposing upper and lower edges of said mounting portion and a slot extending inward from an end portion of said mounting portion, wherein the mounting portion of each spring lock is inserted into one of said mounting recesses and the nubs extending outward from the mounting portion of each spring lock are received by the vertically opposed depressions defined in said upper and lower surfaces of each mounting recess,
a binder portion, and
a connecting portion extending between said mounting portion and said binder portion;
the binder portion of each said spring lock further comprising a clamping section, a curved section intermediate said connecting portion and said clamping section, and an upturned lip portion extending from the clamping section; and
a mating recess defined in the vertical end portions of each secondary sidewall to receive the binder portion of each spring lock when the secondary sidewalls are pivoted to their upright positions such that a clamping surface of the clamping section of each spring lock is compressed against an inner wall portion of each said mating recess.

* * * * *

UNITED STATES PATENT AND TRADEMARK OFFICE
CERTIFICATE OF CORRECTION

PATENT NO. : 9,919,832 B2
APPLICATION NO. : 14/785760
DATED : March 20, 2018
INVENTOR(S) : Mitchell et al.

It is certified that error appears in the above-identified patent and that said Letters Patent is hereby corrected as shown below:

On the Title Page

Item (73), Assignee: Macro Plastics, Inc., "Fairfeild," CA (US) should be corrected to Macro Plastics, Inc. -- Fairfield -- CA (US)

Signed and Sealed this
Twelfth Day of June, 2018

Andrei Iancu
*Director of the United States Patent and Trademark Office*